Patented May 19, 1942

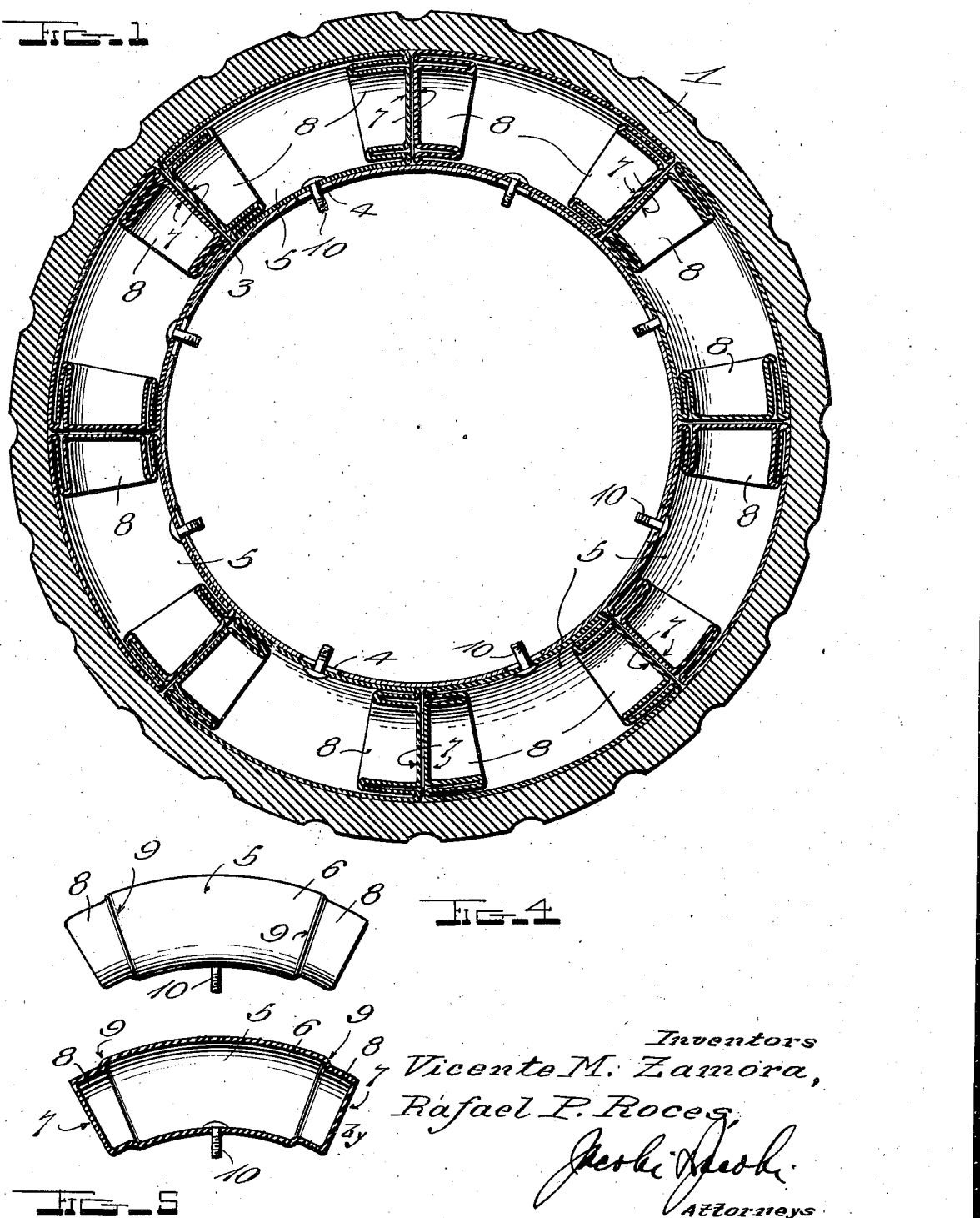

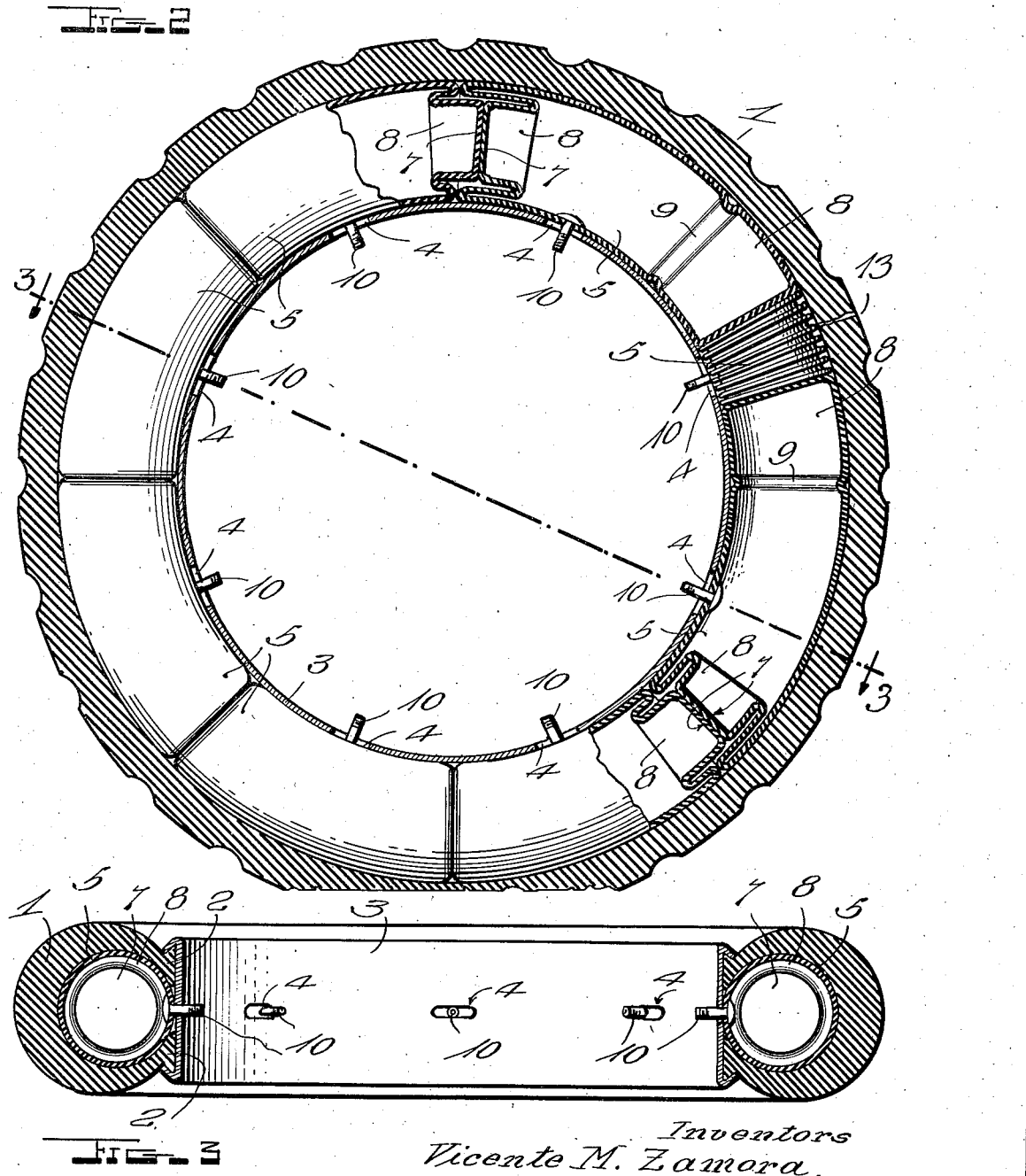

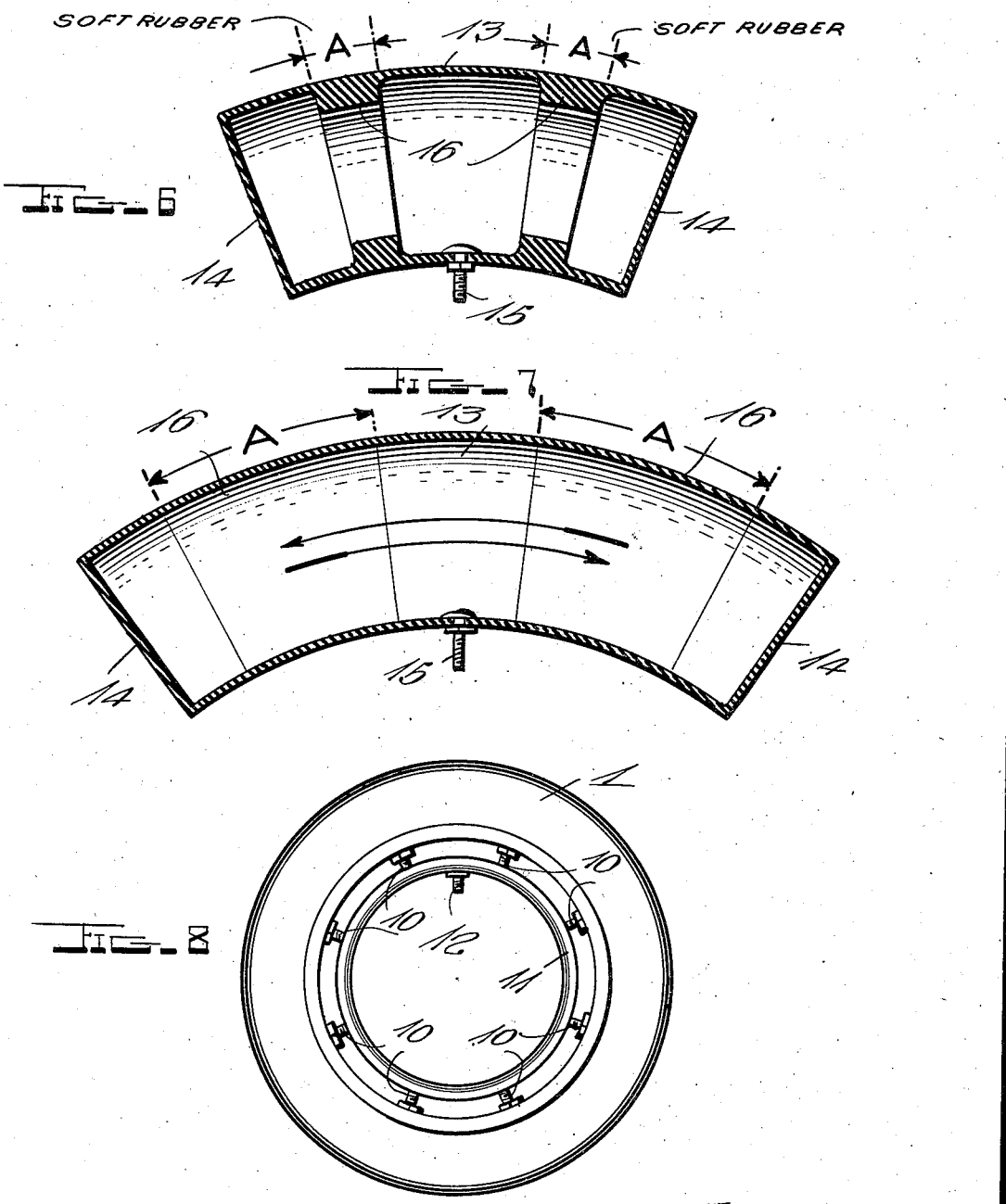

2,283,843

UNITED STATES PATENT OFFICE 2,283,843

PNEUMATIC TIRE

Vicente M. Zamora and Rafael P. Roces,
Manila, P. I.

Application March 18, 1940, Serial No. 324,451

5 Claims. (Cl. 152—334)

This invention relates to pneumatic tires and it is one object of the invention to provide a tire including in its construction a plurality of air containers enclosed within a tire casing and extending circumferentially thereof in end to end engagement with each other, the air container being of such construction that when one is punctured and air allowed to escape therefrom, the other containers will be extended longitudinally to collapse the punctured container to a compact mass and take up the space previously occupied thereby. It will thus be seen that while the air pressure will be somewhat reduced, the pressure will be substantially the same throughout the circumference of the tire and the tire caused to ride easily, although in a slightly deflated condition.

Another object of the invention is to so form the air containers that while they may be extended longitudinally when one is punctured, they will normally all be of the same predetermined length and each extend circumferentially of the tire the same distance.

Another object of the invention is to so form and arrange the air containers that they may be individually inflated, or all inflated at the same time through the medium of inflating means adapted for connection with the valve stems of all of the air containers.

Another object of the invention is to so form the air containers that they may be very easily fitted into place within a tire casing and individually removed therefrom for repair or replacement in case of a puncture.

Another object of the invention is to so form the containers that when one is punctured the greater portion of longitudinal extension will take place in containers having abutting engagement with the punctured container, a certain amount of extension, however, taking place in the remaining containers and thus causing reduction in air pressure to be distributed throughout the tire.

Still another object of the invention resides in providing a device which is simple and durable in construction, inexpensive to manufacture and one which will be very efficient in operation and application to use.

With these and numerous other objects in view, our invention consists in the novel features of construction, combination and arrangement of parts as will be hereinafter referred to and more particularly pointed out in the specification and claims.

The invention is illustrated in the accompanying drawings wherein

Fig. 1 is a view showing a tire of the improved construction in vertical section.

Fig. 2 is a view similar to Fig. 1 showing one of the air containers collapsed as result of a puncture.

Fig. 3 is a sectional view taken diametrically through the tire along the line 3—3 of Fig. 2.

Fig. 4 is a side elevation of one of the air containers and showing the same in its extended condition.

Fig. 5 is a sectional view taken longitudinally through the air container of Fig. 4.

Fig. 6 is a sectional view taken longitudinally through an air container of a modified construction.

Fig. 7 is a sectional view showing the air container of Fig. 6 in an extended condition.

Fig. 8 is a side elevation illustrating the manner in which the containers may all be simultaneously inflated through the medium of a manifold.

The casing 1 of the tire is of a conventional construction and provided with the usual heel or bead 2 for holding it in engagement with a rim 3 which is also of a conventional formation except that it is provided with a plurality of slots 4 which are elongated circumferentially of the rim. It will thus be seen that provision has been made to receive the inflating stems of a plurality of air containers and that the openings 4 have been elongated circumferentially of the rim in order to permit the stems of the air containers to have movement circumferentially of the rim when an air container is punctured and the remaining air containers are extended longitudinally in the tire casing 1. The air containers which are indicated in general by the numeral 5 are of a duplicate construction and while eight of these containers have been shown in the tire casing, it is to be understood that a greater number or a smaller number may be provided if so desired. Each of the containers shown in place within the tire casing in Figures 1 and 2 is of the construction shown in Figures 4 and 5. Referring to Figures 4 and 5, each of the air containers has a body 6 formed of rubber and of elongated tubular formation but closed at its ends by head 7. The end portions 8 of the body are of reduced diameter and set off from the remainder of the body by circumferentially extending shoulders 9 which cause the reduced end portions to very easily assume the telescoped positions shown in Figure 1 when the air containers are fitted into the tire casing and disposed in end to end engagement with each other. The air containers are arcuate longitudinally and of such length that when the proper number are fitted within the tire casing they will extend about the entire circumference thereof with the heads 7 of the containers in flat face to face engagement with each other and the end portions 8 of the containers telescoped into the body portions of the containers. The inflating tubes 10 are of a conventional valve-controlled formation and extend from inner peripheral portions of the containers midway the length thereof in position for passing through the openings 4 formed in the rim 3. In view of the fact that the openings 4 are extended circumferentially of the rim the inflating stems 10 may have movement circumferentially of the rim and thus permit the air containers to have limited movement circumferentially of the rim and the tire casing and assume their proper positions in the tire casing when one of the air containers is punctured.

When a pneumatic tire of the improved construction is in use, the air containers are placed within the casing with their heads 7 in face to face engagement with each other and their end portions in the retracted or telescoped condition shown in Figure 1. The inflating stems 10 pass through the openings 4 in the rim when the casing is applied to the rim. The air containers are then individually inflated by successively applying the end of a tube or hose leading from a storage tank containing air under pressure until all of the containers are all filled with air under pressure of thirty pounds or any other predetermined pressure when the containers are thus inflated, the pressure therein will cause the same to snugly fit within the casing and rim, thereby urging the stems 10 outwardly through the openings 4 wherein they are firmly held by reason of the pressure within the containers urging the same outwardly against the rim as clearly shown in Figure 2 of the drawings. If so desired, the inflating stems 10 may be connected with an inflating ring or manifold 11 having a valve-controlled stem 12 as shown in Figure 8. This inflating ring or manifold 11 may be left in engagement with the inflating stems 10 or if they be in the nature of an accessory kept at a filling station or in a convenient place in the automobile or other motor vehicle, and only applied while the containers are being inflated. Under normal conditions the air containers remain in the condition shown in Figure 1 with their end portions 8 in the retracted condition. When the casing 1 and one of the air containers is punctured as shown at 13 in Figure 2, air escapes from the punctured container and the end portions 8 of the adjoining air containers will move outwardly to the extended position shown at the right of Figure 2. The punctured air container will then be collapsed into a compact mass and form a good abutment for the extended ends of the adjoining air containers. During outward movement of the end portions 8 of the adjoining air containers, the end portions 8 of the remaining air containers will also have a tendency to move outwardly as pressure of air in the said adjoining air containers is reduced. This is clearly shown in Figure 2 where certain of the end portions 8 have partially moved to an extended position and the end portions of containers in abutting engagement therewith have been forced inwardly to a greater extent. It will be understood that the end portions 8 of all of the air containers will eventually move longitudinally to some extent and the body portions also allowed to yield somewhat until the containers which are still inflated are evenly distributed throughout the circumference of the tire casing. The air pressure will be somewhat reduced due to escape of air from the punctured air container but due to movement of the end portions of the containers the air pressure will be evenly distributed throughout the circumference of the tire and substantially the same at all points. Therefore, the tire will ride easily even though its normal pressure has been reduced.

Instead of forming the air containers as previously described, they may be formed as shown in Figures 6 and 7. In this embodiment of the invention there has been shown an air container 13 formed of rubber and having heads 14 at its ends corresponding to the heads 7 of the containers 5. There has also been provided a valve-controlled inflating stem 15 corresponding to the inflating stems 10. Instead of providing the air container 13 with reduced end portions which are to be telescoped into the body portion of the container, there have been provided wall portions or sections 16 which are of softer rubber having greater elasticity than the rubber from which the remainder of the container is formed. These sections 16 of soft rubber are spaced from ends of the container and normally extend longitudinally of the container the distance indicated by the lines A in Figure 6, and it should be noted that these portions are inwardly thickened an appreciable extent. When the air containers are all inflated they remain as shown in Figure 6, but when one of them is punctured and the air escapes therefrom, the pressure of air in the adjoining containers will cause the sections 16 to be extended to the extent indicated by the lines A in Figure 7. These portions will then be of approximately the same thickness as the remainder of the container. It will thus be seen that in this embodiment of the invention, the containers at opposite sides of a punctured container may be extended longitudinally and all of the remaining unpunctured containers eventually become extended by air pressure until they are substantially equally extended and air pressure equalized throughout the circumference of the tire.

From the foregoing description of the construction of our improved device, the operation thereof and the method of applying the same to use, will be readily understood. It will be seen that we have provided a simple, inexpensive and efficient means for carrying out the objects of the invention and while we have particularly described the elements best adapted to perform the function set forth, we wish it to be understood that we do not desire to be limited to the exact details of construction shown and described, for obvious modifications will occur to a person skilled in the art without departing from the spirit or sacrificing any of the principles of the invention.

Having thus described the invention, what is claimed is:

1. A pneumatic tire comprising a casing, and air containers in said casing extending circumferentially of the casing in end to end relation to each other, each container having a tubular body formed with heads at its ends, end portions of the body being shifted inwardly into the body in telescoped relation thereto and held in the retracted position by engagement with the head at the adjacent end of an adjoining container, the telescoped end portions of said containers being movable outwardly to an extended position to collapse a punctured container and occupy a portion of the space in the casing previously occupied by the punctured container.

2. A pneumatic tire comprising a casing, and a plurality of air containers therein extending circumferentially of the container in end to end relation to each other, said containers each having its end portions of reduced diameter to provide end portions adapted to be shifted inwardly to a retracted position and held in the retracted position by engagement with the outer ends of the retracted end portions of adjoining containers until shifted outwardly by pressure of air in the containers when an adjoining container is punctured.

3. An air container having a tubular body, for use with a plurality of like containers in a pneumatic tire casing, heads closing ends of said body, end portions of said body being of reduced diameter defining circumferentially extending shoulders spaced from ends of the body and providing the body with constricted end portions adapted to be shifted inwardly to a restricted position and yieldably held in a retracted position by pressure of adjoining containers until moved outwardly to an extended position by air pressure when an adjoining container is punctured and deflated.

4. An air container having a tubular body, for use with a plurality of like containers in a pneumatic tire casing, heads closing ends of said body, end portions of said body being of reduced diameter to provide the body with reduced end portions adapted to be shifted inwardly to a retracted position and moved outwardly to an extended position by pressure of air in the body when an adjoining air container in a tire is punctured.

5. A pneumatic tire comprising a casing, a rim carrying said casing and formed with a plurality of circumferentially extending slots spaced from each other circumferentially thereof, and a plurality of air containers in said casing extending circumferentially thereof in end to end relation to each other and provided with inflating stems extending through the slots in the rim, said containers being provided with end portions shifted inwardly into the body in telescoped relation thereto, the end portions of said containers adapted to be moved from a retracted position to an extended position by pressure of air in the containers when an adjoining container is punctured.

VICENTE M. ZAMORA.
RAFAEL P. ROCES.